United States Patent
Ghosh et al.

(10) Patent No.: US 11,129,037 B2
(45) Date of Patent: *Sep. 21, 2021

(54) CROSS LINK INTERFERENCE MEASUREMENT FOR WIRELESS COMMUNICATIONS IN 5G OR OTHER NEXT GENERATION NETWORK

(71) Applicant: AT&T INTELLECTUAL PROPERTY I, L.P., Atlanta, GA (US)

(72) Inventors: Arunabha Ghosh, Austin, TX (US); Thomas Novlan, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/590,487

(22) Filed: Oct. 2, 2019

(65) Prior Publication Data
US 2020/0037185 A1 Jan. 30, 2020

Related U.S. Application Data

(63) Continuation of application No. 15/406,428, filed on Jan. 13, 2017, now Pat. No. 10,477,420.

(51) Int. Cl.
*H04W 24/08* (2009.01)
*H04B 17/318* (2015.01)
(Continued)

(52) U.S. Cl.
CPC .......... *H04W 24/08* (2013.01); *H04B 17/318* (2015.01); *H04B 17/345* (2015.01);
(Continued)

(58) Field of Classification Search
CPC .............. H04W 24/08; H04W 72/1231; H04B 17/318; H04B 17/336; H04B 17/345
See application file for complete search history.

(56) References Cited

U.S. PATENT DOCUMENTS

| 6,295,279 B1 | 9/2001 | Lin |
| 6,694,141 B1 | 2/2004 | Pulkkinen et al. |

(Continued)

FOREIGN PATENT DOCUMENTS

| WO | 2013/056494 A1 | 4/2013 |
| WO | 2013/086362 A1 | 6/2013 |

(Continued)

OTHER PUBLICATIONS

Padhye, et al. "Estimation of link interference in static multi-hop wireless networks.," Proceedings of the 5th ACM SIGCOMM conference on Internet Measurement, USENIX Association, 2005, 6 pages.

(Continued)

*Primary Examiner* — Rhonda L Murphy
(74) *Attorney, Agent, or Firm* — Amin, Turocy & Watson, LLP

(57) ABSTRACT

A cross link interference (CLI) measurement system is disclosed. The cross link interference measurement system can measure both unconstrained CLI that do not require any special constraints on the frame structure, and constrained CLI that does require special constraints on the frame structure (e.g., measurement gaps). The system does this in part by not only measuring reference signal received powers, but also determining load based on a power scaling of a reference signal and based on angle of arrival determinations.

20 Claims, 10 Drawing Sheets

(51) Int. Cl.
  *H04B 17/345* (2015.01)
  *H04W 72/12* (2009.01)
  *H04B 7/024* (2017.01)
  *H04J 11/00* (2006.01)

(52) U.S. Cl.
  CPC .......... *H04B 7/024* (2013.01); *H04J 11/0023* (2013.01); *H04W 72/1231* (2013.01)

(56) References Cited

U.S. PATENT DOCUMENTS

| | | |
|---|---|---|
| 7,574,179 B2 | 8/2009 | Barak et al. |
| 8,045,562 B2 | 10/2011 | Lee et al. |
| 8,265,560 B2 | 9/2012 | Pan |
| 8,605,687 B2 | 12/2013 | Barak et al. |
| 8,780,743 B2 | 7/2014 | Sombrutzki et al. |
| 8,824,311 B2 | 9/2014 | Beaudin |
| 8,913,530 B2 | 12/2014 | Dimou et al. |
| 9,560,540 B2 | 1/2017 | Hammarwall et al. |
| 9,591,655 B2 | 3/2017 | Hammarwall et al. |
| 9,609,650 B2 | 3/2017 | Pan et al. |
| 9,749,263 B2 * | 8/2017 | Jin .................. H04B 17/309 |
| 2010/0284359 A1 | 11/2010 | Kim et al. |
| 2011/0201297 A1 | 8/2011 | Adler et al. |
| 2013/0315174 A1 | 11/2013 | Savoor et al. |
| 2013/0322277 A1 | 12/2013 | Vanganuru et al. |
| 2014/0050166 A1 | 2/2014 | Lim et al. |
| 2014/0226504 A1 | 8/2014 | Tavildar et al. |
| 2015/0079917 A1 | 3/2015 | Mujtaba et al. |
| 2015/0171948 A1 | 6/2015 | Xiao et al. |
| 2015/0245234 A1 | 8/2015 | Roy et al. |
| 2016/0127273 A1 | 5/2016 | Jin et al. |
| 2016/0183286 A1 | 6/2016 | Park et al. |
| 2016/0197690 A1 | 7/2016 | Li et al. |
| 2016/0381590 A1 | 12/2016 | Lysejko et al. |
| 2017/0223737 A1 | 8/2017 | Patel et al. |

FOREIGN PATENT DOCUMENTS

| | | |
|---|---|---|
| WO | 2014/110783 A1 | 7/2014 |
| WO | 2016/206629 A1 | 12/2016 |

OTHER PUBLICATIONS

Ramachandran, et al.,"Interference-Aware Channel Assignment in Multi-Radio Wireless Mesh Networks.," Infocom, vol. 6, 2006, 12 pages.

Liu, et al. "Slot allocation algorithms in centralized scheduling scheme for IEEE 802.16 based wireless mesh networks.," Computer Communications 32.5, 2009, 943-953, 11 pages.

Non-Final Office Action received for U.S. Appl. No. 15/406,428 dated Mar. 26, 2018, 25 pages.

Final Office Action received for U.S. Appl. No. 15/406,428 dated Oct. 22, 2018, 20 pages.

Non-Final Office Action received for U.S. Appl. No. 15/406,428 dated Mar. 8, 2019, 21 pages.

* cited by examiner

CROSS LINK INTERFERENCE MEASUREMENT FOR WIRELESS COMMUNICATIONS IN 5G OR OTHER NEXT GENERATION NETWORK

RELATED APPLICATION

The subject patent application is a continuation of, and claims priority to, U.S. patent application Ser. No. 15/406,428 (now U.S. Pat. No. 10,477,420), filed Jan. 13, 2017, and entitled "CROSS LINK INTERFERENCE MEASUREMENT FOR WIRELESS COMMUNICATIONS IN 5G OR OTHER NEXT GENERATION NETWORK," the entirety of which application is hereby incorporated by reference herein.

TECHNICAL FIELD

The present application relates generally to the field of mobile communication and, more specifically, to measuring cross link interference for wireless communications in a next generation network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
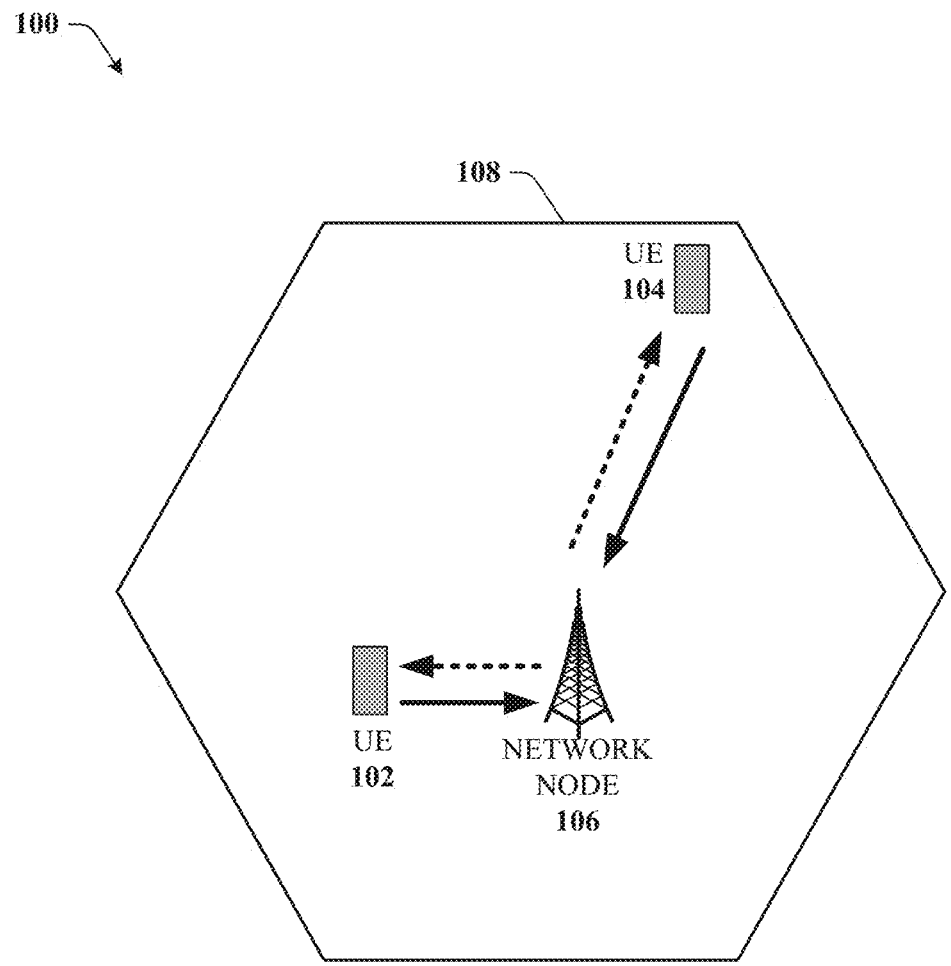
FIG. 1 illustrates an example wireless communication system in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In various embodiments, a receiver device can comprise a processor and a memory that stores executable instructions that, when executed by the processor facilitate performance of operations. The operations can comprise measuring a signal strength of a first transmission received from a first transmitter device. The operations can also comprise measuring a cross link interference of a second transmission received from a second transmitter device. The operations can also comprise determining a degradation level of a signal link associated with the first transmission based on a function of a difference between the signal strength of the first transmission and the cross link interference of the second transmission.

In another embodiment, a receiver device can comprise a processor and a memory that stores executable instructions that, when executed by the processor facilitate performance of operations. The operations can comprise receiving, via an over the air connection, a reference signal from a transmitter device via antennas of the receiver device. The operations can also comprise determining respective powers of the reference signal corresponding to the antennas based on a function associated with the antennas. The operations can also comprise determining a load at the transmitter device based on the respective powers of the reference signal. The operations can also comprise estimating a cross link interference based on the load of the transmitter device.

In another embodiment a method can comprise measuring, by a receiver device comprising a processor, a signal strength of a first transmission received from a first transmitter device. The method can also comprise measuring, by the receiver device, a cross link interference of a second transmission received from a second transmitter device. The method can also comprise determining, by the receiver device, a degree of degradation of a signal link associated with the first transmission based on a function of a difference between the signal strength of the first transmission and the cross link interference of the second transmission.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates of an example wireless communication system 100 that facilitates measuring channel interference, and in particular, cross link interference (CLI) in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

In example embodiments, the UE 102 and 104 can send and/or receive communication data via a wireless link to the network node 106. The dashed arrow lines from the network node 106 to the UE 102 and 104 represent downlink (DL) communications and the solid arrow lines from the UE 102 and 104 to the network nodes 106 represents an uplink (UL) communication.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In various embodiments, the network node 106 can measure cross link interference (CLI) originating from either of the UE 104 or 102. Similarly, the UEs can measure CLI. In traditional LTE, the only interference measurement available is reference signal received power (RSRP) which is only useful for radio resource management from the network node 106 since the measurements are long term. Measuring RSRP is cumbersome due to the levels UE processing and system resources (e.g., having to use multiple channel state indicator reference signals).

Figure 2:
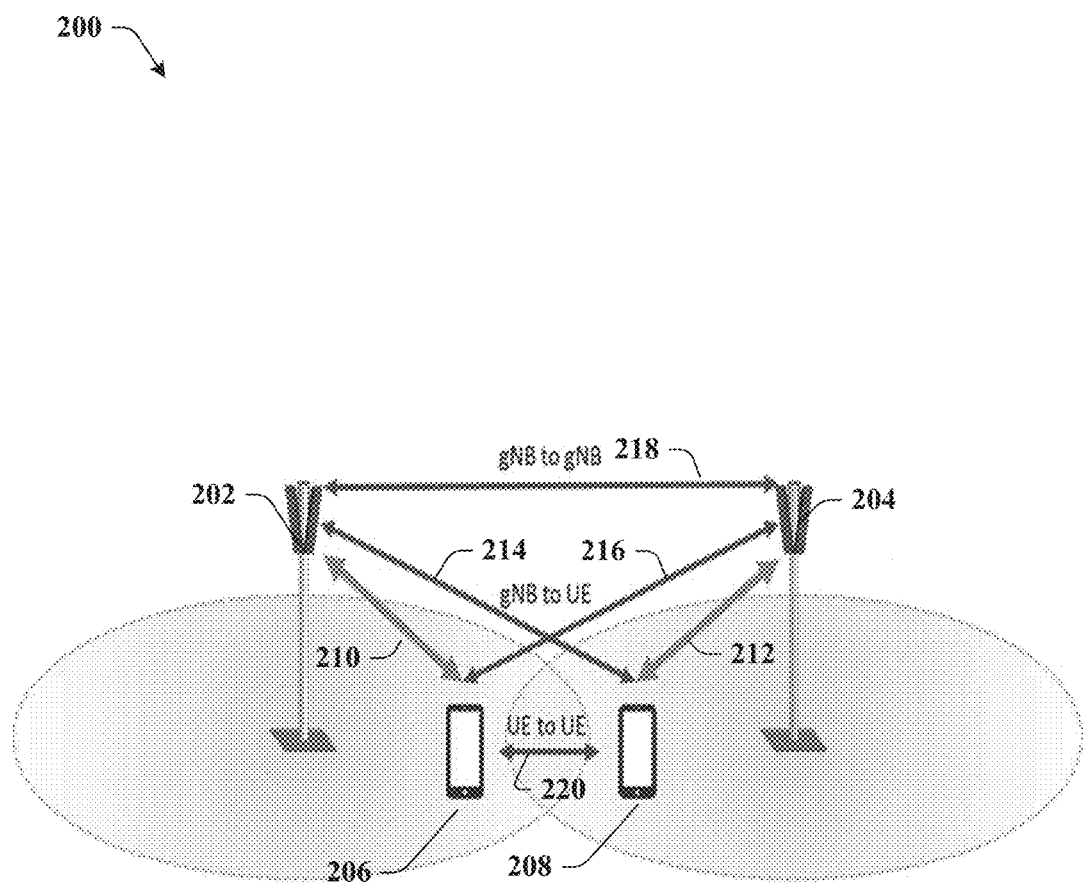
FIG. 2 illustrates an example block diagram of cross link interference in a wireless environment in accordance with various aspects and embodiments of the subject disclosure.

Turning now to FIG. 2, illustrated is an example block diagram 200 of cross link interference in a wireless environment in accordance with various aspects and embodiments of the subject disclosure. Cross link interference that interferes with signals sent between devices can be caused by signals from other device. For instance, shown in FIG. 2, a signal transmission 210 sent from base station device 202 to mobile device 206 can be subject to CLI from another mobile device 208 (CLI 220) and from another base station device 204 (CLI 216). Likewise, for a transmission 212 sent from base station device 204 to mobile device 208, there can be CLI from mobile device 206 (CLI 220) and from base station device 202 (CLI 214). Additionally there can be CLI 218 between the base station devices 202 and 204. Features such as dynamic time division duplexing can cause CLI 218 and 220 since different nodes can use different subframe structures. Transmit and receive beamforming can minimize CLI in 5G wireless environments, but in order to achieve that capability, each of the devices should be able to measure CLI independently, and not have to rely on implicit measurements via reference signal received power measurements.

It should be noted that CLI such as gNB to UE can be measured without any frame structure constraints, i.e. for any frame structure it is possible to measure these CLI. However to measure CLI from UE to UE and gNB to gNB, the frame structure can be adjusted to allow for the measurements. For example if every subframe is using the same frame structure (i.e. same downlink to uplink ratio) then UE to UE CLI and gNB to gNB CLI cannot be measured as long as both gNB and UE are half duplex. This is because when a UE is in receive mode, every other UE will also be in receive mode therefore UE to UE CLI cannot be measured since the interfering UE which is also in receive mode and it cannot simultaneously transmit due to the half-duplex constraints. Similarly the gNB to gNB CLI cannot be measured without some kind of special constraints on the subframe. Accordingly, there can be two different types of CLI measurements, those that can be performed without constraints on the frame structure, and those that have adjustments to the frame structure.

Unconstrained CLI Measurements:

These are the CLI measurements that can performed without any special constraints on the frame structure (e.g. measurement gaps) while preserving the half-duplex constrains of the gNB and UE. The gNB to UE and UE to gNB CLI (e.g., CLIS 214 and 216) are examples of such unconstrained CLI measurements.

Constrained CLI Measurements:

These are the CLI measurements that require some form of special frame structure constraint to perform while preserving the half-duplex constraints. gNB to gNB (e.g., CLI 218) and UE to UE (e.g., CLI 220) CLI are examples of such constrained CLI measurements.

There are several measurement dimensions when measuring CLI that should be considered.

In an embodiment, the system disclosed herein provides a mechanism for measuring short term CLI. While RSRP can be considered a longterm CLI, it has limited usefulness. Long term CLI can facilitate handover operations, RRC (radio resource) configuration (e.g. CoMP set configuration, SCell configuration etc). In the case of 5G, these long term measurements could be used for other features as well. Short term CLI on the other hand can be useful for things such as link adaptation, dynamic time division duplex (TDD) frame structure setting, spectrum sharing, and etc.

Similarly, CLI measurements, can be associated with multi-antenna or single antenna systems. Both multi-antenna and single antenna measurements have their values. Single antenna CLI measurements are easier to perform and consume fewer resources compared to multi-antenna CLI. However on the other hand multi-antenna CLI can allow for features such as coordinated beamforming and allow for dynamic TDD by spatially isolating the links that would otherwise interfere.

Additionally, Just like CSI measurements, CLI measurements can be both narrowband as well as wideband. In the case of NR (New Radio) the system bandwidths can be very large so it is quite likely that interference coupling between two nodes can be different in different parts of the system bandwidth.

Based on this the CLI measurements can be divided into the categories shown in Table 1.

| Category | Priority | Measurement Type | Measurement Content | Notes |
|---|---|---|---|---|
| Category 1 | High | Long term Single antenna port Wideband | Example: RSRP, load, differential AOA | Can be used for RRM/RRC related procedures. Also one could say that such measurements are already included to some extent since some form of basic long term RSRP measurements is already agreed upon for NR |
| Category 2 | High | Short term Single antenna port Wideband | Example: short term RSRP, short term load, CQI delta, beam ID | Can be used for features such as fast link adaptation, coordinated scheduling and dynamic TDD, IAB |
| Category 3 | Medium | Short term Multiple antenna port Wideband | Example: short term RSRP, short term load, CQI delta, beam ID, precoder* | Can be used for features such as fast link adaptation, coordinated scheduling with coordinated beamforming and dynamic TDD, IAB |
| Category 4 | Low | Short term Multiple antenna port Sub-band | Example: short term RSRP, short term load, CQI delta, beam ID, precoder* | |

In an embodiment, load can be key parameter apart from signal strength. If for example, a signal strength between base station device 204 and 206 is very strong, but there is little load, the overall amount of CLI 216 will not be as significant if the load were higher.

To determine the load and the effects on CLI, the power scaling of a reference signal can be determined as a proxy for the function of the load on the transmitter. So the transmitter (e.g., transmitter 204) transmits the RS which is measured by the receiver (e.g., device 206) to measure the CLI. Since the power of the RS depends on the load, such as design inherently captures the effect of load on the CLI measurements. Therefore the transmitted CLI-RS is given by:

$$\tilde{s}_{n,m} = f(\rho) s_{n,m} \quad \text{Equation 1:}$$

Where $s_{n,m}$ is the unscaled version of the CLI-RS (shown as a vector to capture the fact that CLI-RS might actually be multi-antenna CLI-RS) and n and m are the symbol and subcarrier index respectively. Additionally, in Equation 1, $\rho$ is the system load in terms of resource occupancy or power utilization. Since CLI can be about interference measurement, resource utilization can serve as an indicator of load. The function $f$ can be any generic function and perhaps the most common function would be a square root function thereby making the interference power measured by the receiver proportional to the load, however other function for $f$ can also be possible in other embodiments. In various embodiments, selection of the function can be based on the priority and quality of service requirements of the traffic.

The received signal at the receiver measuring the CLI is given by:

$$r_{n,m} = H_{n,m} f(\rho) s_{n,m} + z \quad \text{Equation 2:}$$

The per-antenna received power at the receiver is therefore given by:

$$p_{n,m} = \frac{1}{N_r} \|H_{n,m}\|^2 f^2(\rho) + N_o W \quad \text{Equation 3}$$

Thus the measured interference power per antenna comprises the load information. It should be noted additionally that power is only one form of CLI measurement and in other embodiments other parameters can be measured to represent CLI.

Figure 3:
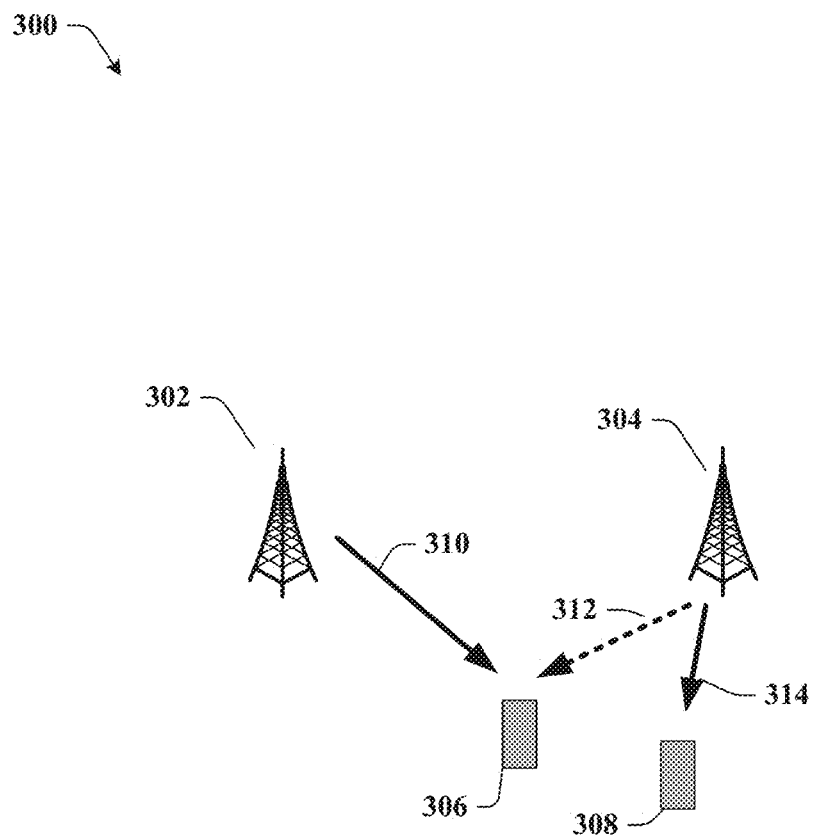
FIG. 3 illustrates an example block diagram of system that measures angle of arrival of signals in a wireless environment in accordance with various aspects and embodiments of the subject disclosure.

Turning now to FIG. 3, illustrated is an example block diagram 300 of system that measures angle of arrival of signals in a wireless environment in accordance with various aspects and embodiments of the subject disclosure. In an embodiment, a mobile device 306 can receive a signal 310 from a base station device 302, but also experience CLI 312 from base station 304 that is sending a transmission 314 to another mobile device 308 nearby. Mobile device 306, using a multi-antenna system, can measure the angle of arrival of the transmission 312 causing CLI, and report the angle of arrival back to the network. The network can determine which base station was the source of the CLI from the angle information and the location information of the mobile device 306 and can instruct base station device 304 to use beam forming to redirect the transmission such that the CLI 312 is reduced, while still maintaining a link with device 308.

In an embodiment, long term channel angle of arrival (AOA) stats can potentially help identify links that can be mutual uncoupled due to beamforming at the transmitter and the receiver. Since the analog (RF) domain is determined by long term stats such as AOA. Therefore having AOA related information could be useful. Since the AOA is computed related to the UE antenna array plane which can be oriented randomly. Therefore having a AOA of the interfering link relative to the AOA of the best server, differential AOA, can be useful in measuring and reducing CLI.

In other embodiments, multi-antenna measurements can be used to measure CLI. Since 5G NR systems are inherently based on MIMO systems this means that both transmitters and receivers have large degrees of freedom for controlling the spatial signature of the transmitted and received signals. This is important since two nodes might be tightly coupled with high CLI but with transmit and receive beamforming it is possible to isolate the two. Accordingly, CLI measurements can comprise multi-antenna processing related information. This can be in the form of indicating the best beam identification or precoder for minimizing/maximizing the CLI.

Figure 4:
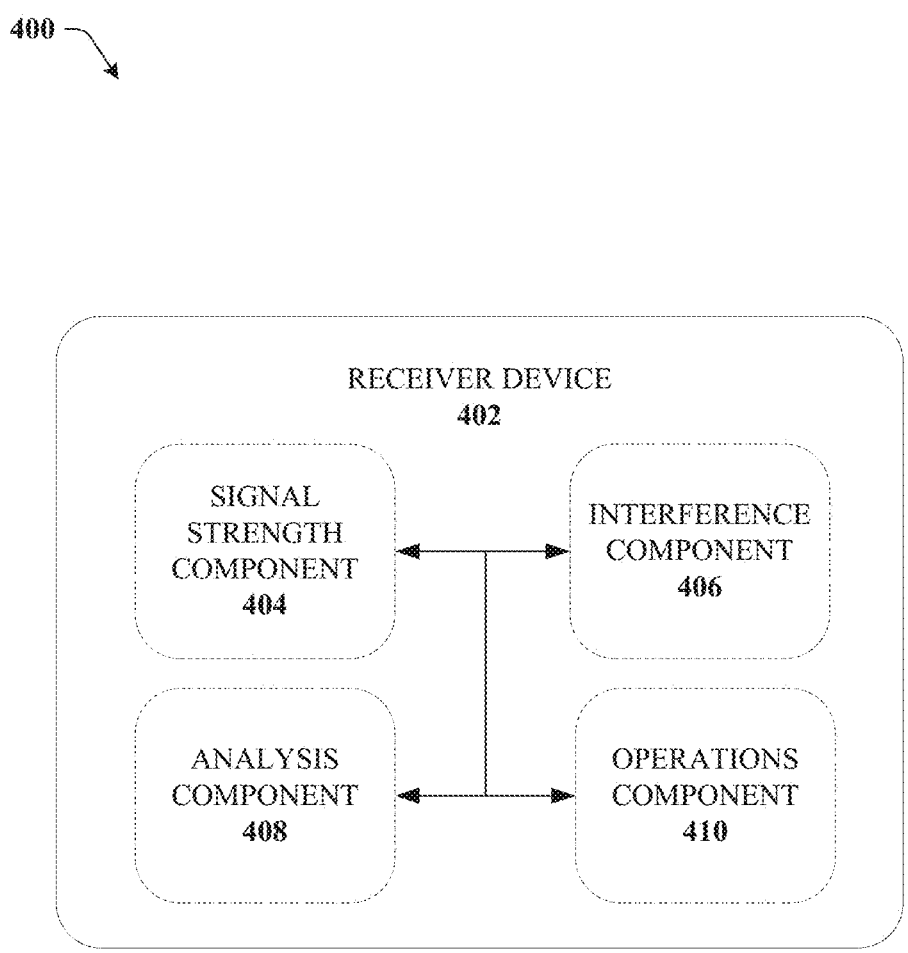
FIG. 4 illustrates an example cross link interference measurement system in accordance with various aspects and embodiments of the subject disclosure.

Turning now to FIG. 4, illustrated is an example cross link interference measurement system 400 in accordance with various aspects and embodiments of the subject disclosure.

As receiver device can comprise a signal strength component 404, and interference component 406, an analysis component 408 and an operations component 410. In an embodiment, the signal strength component 404 can be configured to measure a signal strength of a first transmission received from a first transmitter device. The interference component 406 can determine a cross link interference of a second transmission received from a second transmitter device and the analysis component 408 can determine a degradation level of a signal link associated with the first transmission based on a function of a difference between the signal strength of the first transmission and the cross link interference of the second transmission.

The operations component 410 can send instructions or requests to a network or other mobile device in order to mitigate the CLI. For instance, the operations component 410 can send location information and angle of arrival information to a network in order to implement beam forming to reduce CLI. In other embodiments, the operations component 410 can implement TDD or IAB operations that are based on the CLI measurements.

The interference component 406 can wait for a measurement gap to monitor s between base station devices or between the first mobile device and the second mobile device.

In an embodiment, the analysis component 408 calculates a different channel quality indicator degradation level representing the amount of degradation a signal link is likely to experience due to CLI based on the CLI measurements. So in the context of FIG. 2, this would mean that CLI 214, 216, 220, and 218 is mainly used to gauge the degradation in the signal 210 and 212. This degradation is not implicitly indicated by any of the parameters presented in the previous section, i.e. power, load, best/worst beam/precoder information. This is because none of these measurements actually indicate how strong the CLI is relative to the signal itself. So for example a given receiver might experience high CLI from an interfering transmitter, but the impact to its signal might be minimal if the serving link is much stronger than the interference link.

The differential CQI can in an embodiment essentially be a quantized difference between the quality of the serving link with and without CLI and can be represented by the following equation.

$$\Delta CQI = CQI(H, \hat{H}_1, \hat{H}_2, \ldots \hat{H}_K, N_0 W) - CQI(H, H_i, f(\rho_i), \hat{H}_1, \hat{H}_2, \ldots \hat{H}_K, N_0 W)$$ Equation 4:

In the above equation H is the channel matrix of the serving link, $\hat{H}_1, \hat{H}_2, \ldots \hat{H}_K$ are the channel matrix from interfering links and $H_i$ is the channel matrix of the link whose CLI is being measured.

Figure 5:
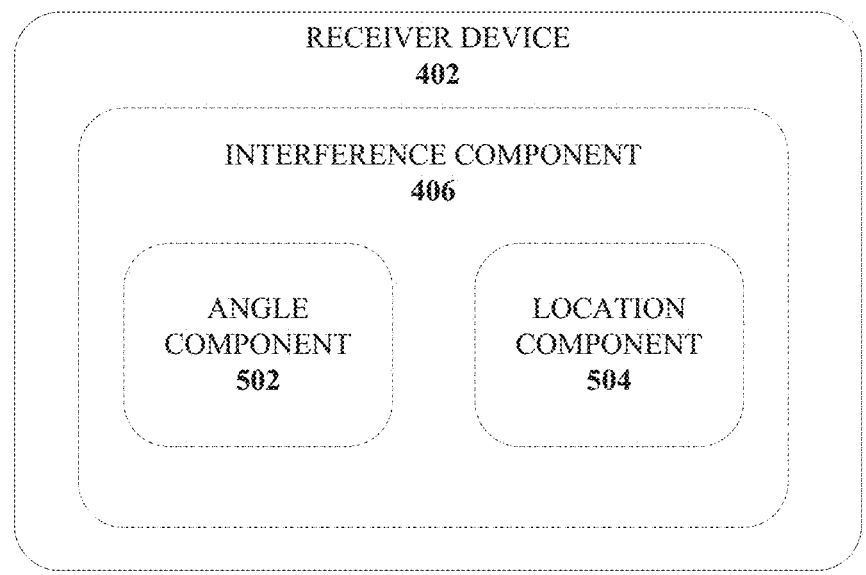
FIG. 5 illustrates another example cross link interference measurement system in accordance with various aspects and embodiments of the subject disclosure.

Turning now to FIG. 5, illustrated is another example cross link interference measurement system 500 in accordance with various aspects and embodiments of the subject disclosure. In the embodiment, shown in FIG. 5, interference component 406 can comprise an angle component 502 that measures the angle of arrival of signals that may cause CLI. A location component 504 can also retrieve location information from the mobile device or base station device in order to transmit to the network. The angle of arrival information and location information can be used to identify base station devices or mobile devices that are contributing to the CLI and use beamforming to reduce or mitigate the level of CLI experienced at the receiver device 402.

Figure 6:
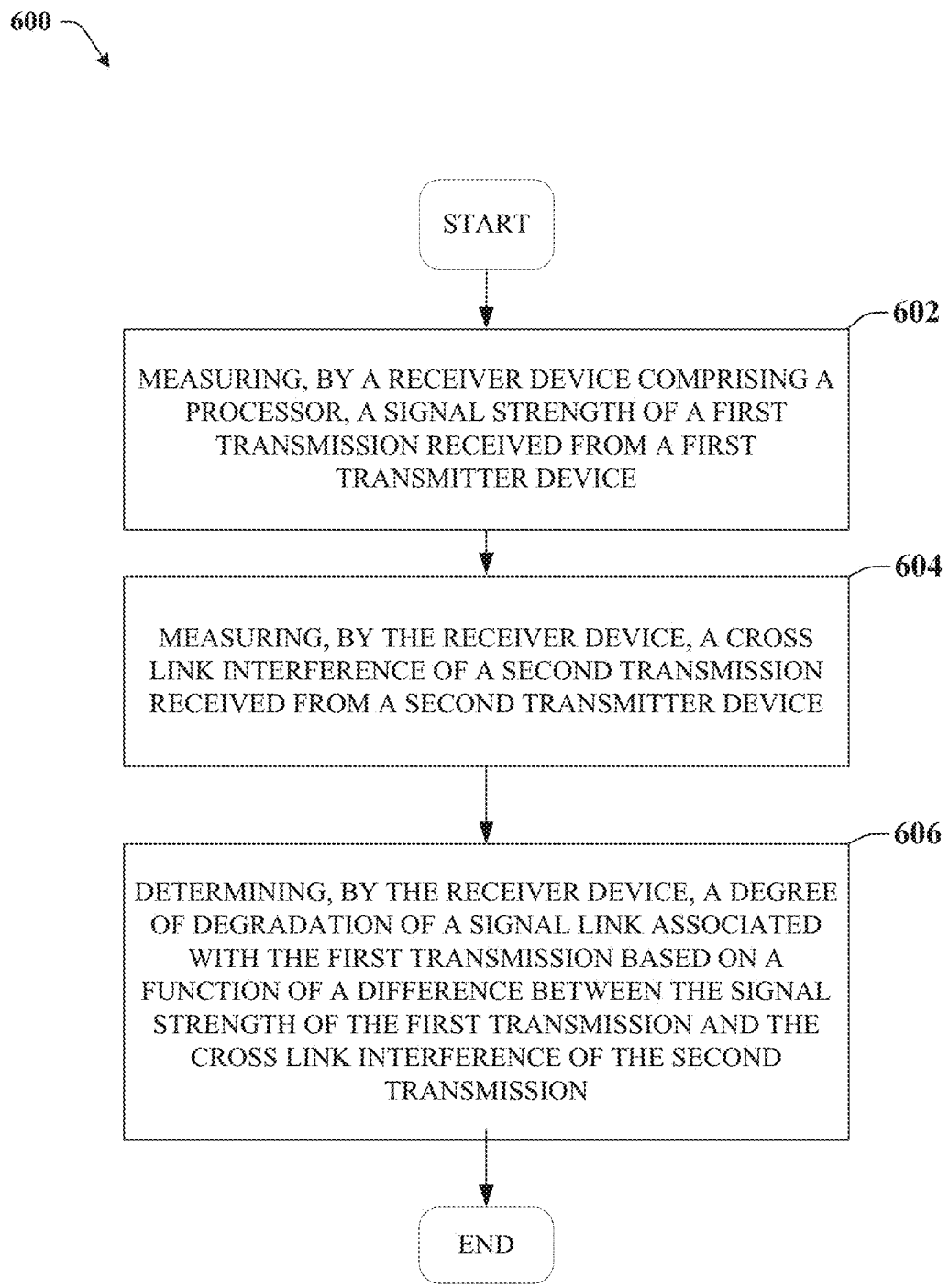
FIG. 6 illustrates an example method for measuring cross link interference in accordance with various aspects and embodiments of the subject disclosure.
Figure 7:
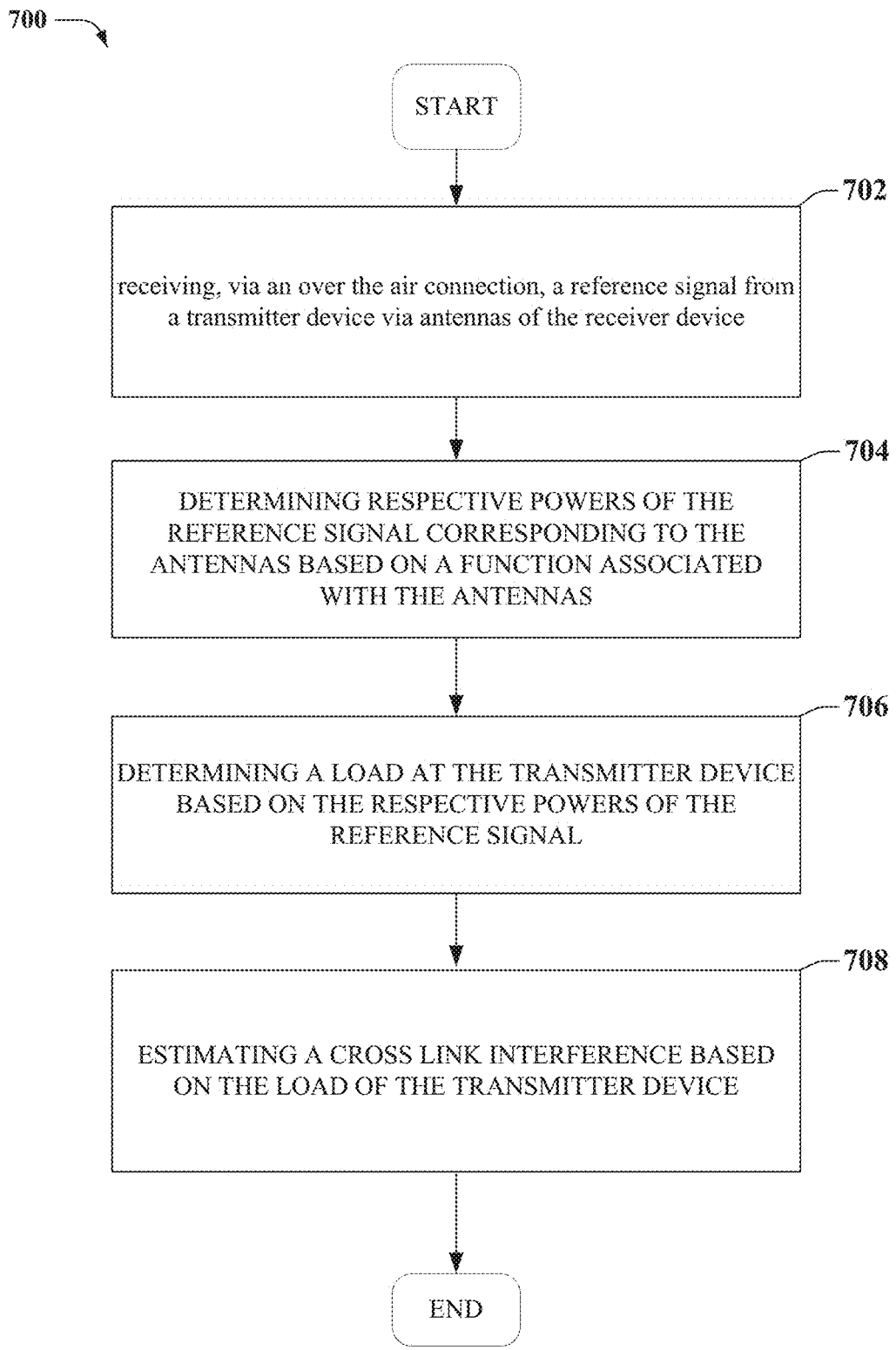
FIG. 7 illustrates an example method for measuring cross link interference in accordance with various aspects and embodiments of the subject disclosure.
Figure 8:
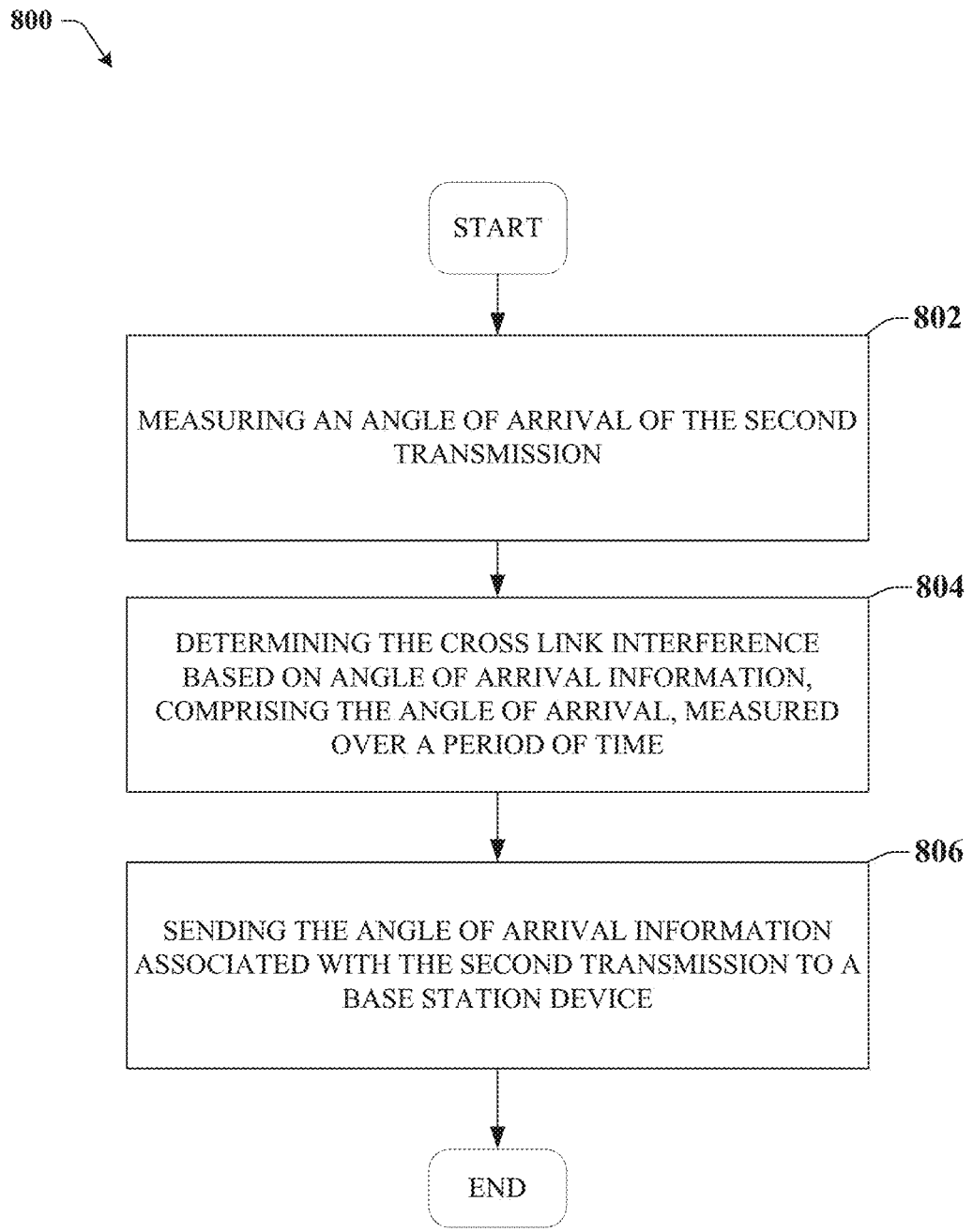
FIG. 8 illustrates an example method for measuring cross link interference in accordance with various aspects and embodiments of the subject disclosure.

FIGS. 6-8 illustrates a process in connection with the aforementioned systems. The process in FIGS. 6-8 can be implemented for example by the systems in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 6, illustrated is an example method for measuring cross link interference in accordance with various aspects and embodiments of the subject disclosure.

Method 600 can start at 602, where the method comprises measuring, by a receiver device comprising a processor, a signal strength of a first transmission received from a first transmitter device.

At 604 the method comprises measuring, by the receiver device, a cross link interference of a second transmission received from a second transmitter device.

At 606, the method comprises determining, by the receiver device, a degree of degradation of a signal link associated with the first transmission based on a function of a difference between the signal strength of the first transmission and the cross link interference of the second transmission.

FIG. 7 illustrates an example method 700 for measuring cross link interference in accordance with various aspects and embodiments of the subject disclosure.

At 702, the method comprises receiving, via an over the air connection, a reference signal from a transmitter device via antennas of the receiver device. At 704, the method comprises determining respective powers of the reference signal corresponding to the antennas based on a function of a load measured at the antennas.

At 706, the method comprises determining a power of the reference signal based on a number of the antennas. At 708 the method comprises determining a cross link interference of the transmitter device based on a difference between the power of the reference signal and a load capacity of the receiver device.

FIG. 8 illustrates an example method 800 for measuring cross link interference in accordance with various aspects and embodiments of the subject disclosure.

Method 800 can start at 802 where the method comprises measuring an angle of arrival of the second transmission and at 804 the method comprises determining the cross link interference based on angle of arrival information, comprising the angle of arrival, measured over a period of time.

At 806 the method comprises sending the angle of arrival information associated with the second transmission to a base station device.

Figure 9:
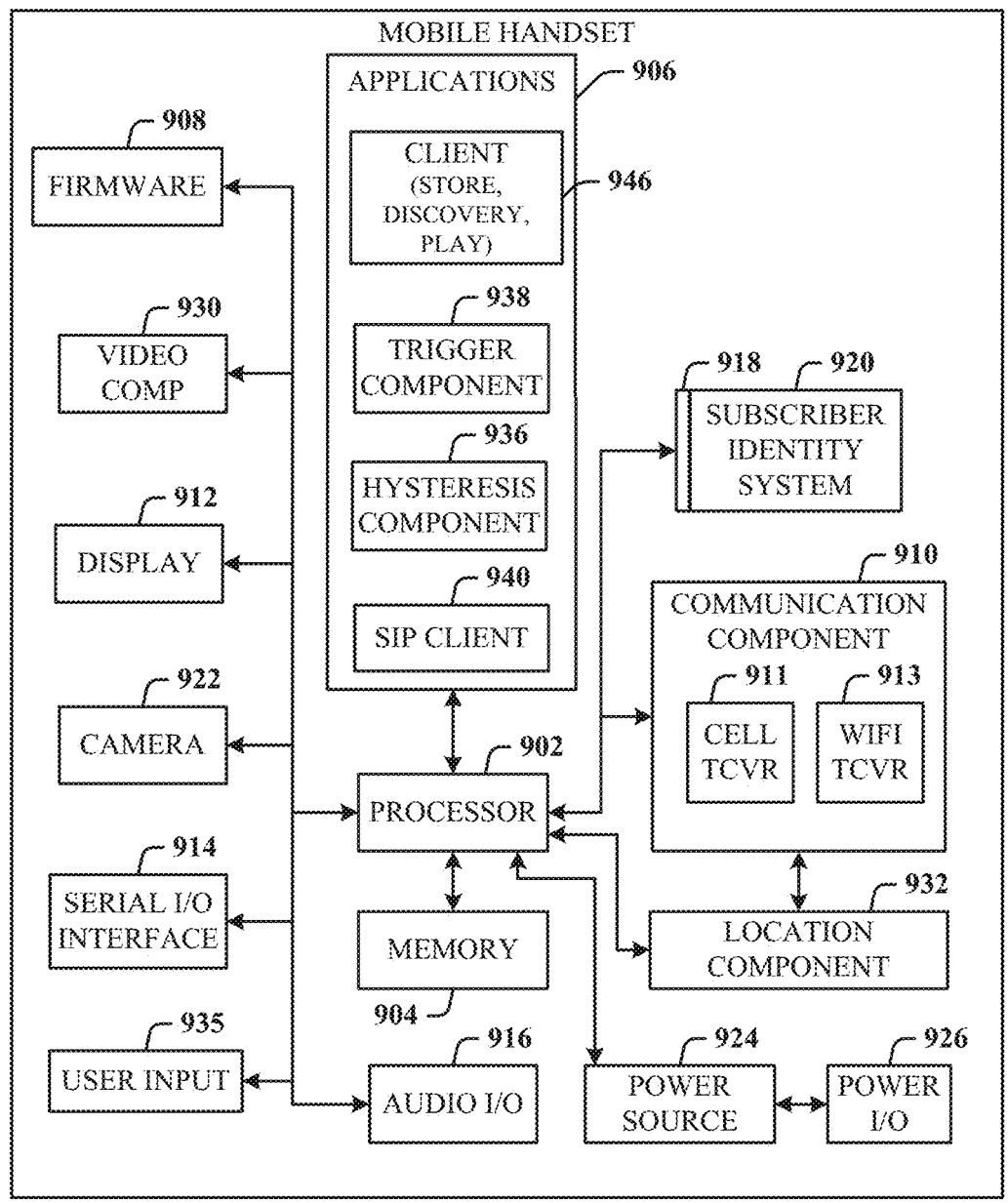
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment (e.g., user equipment 102, 104, 206, 208, 306, 308, or 402) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
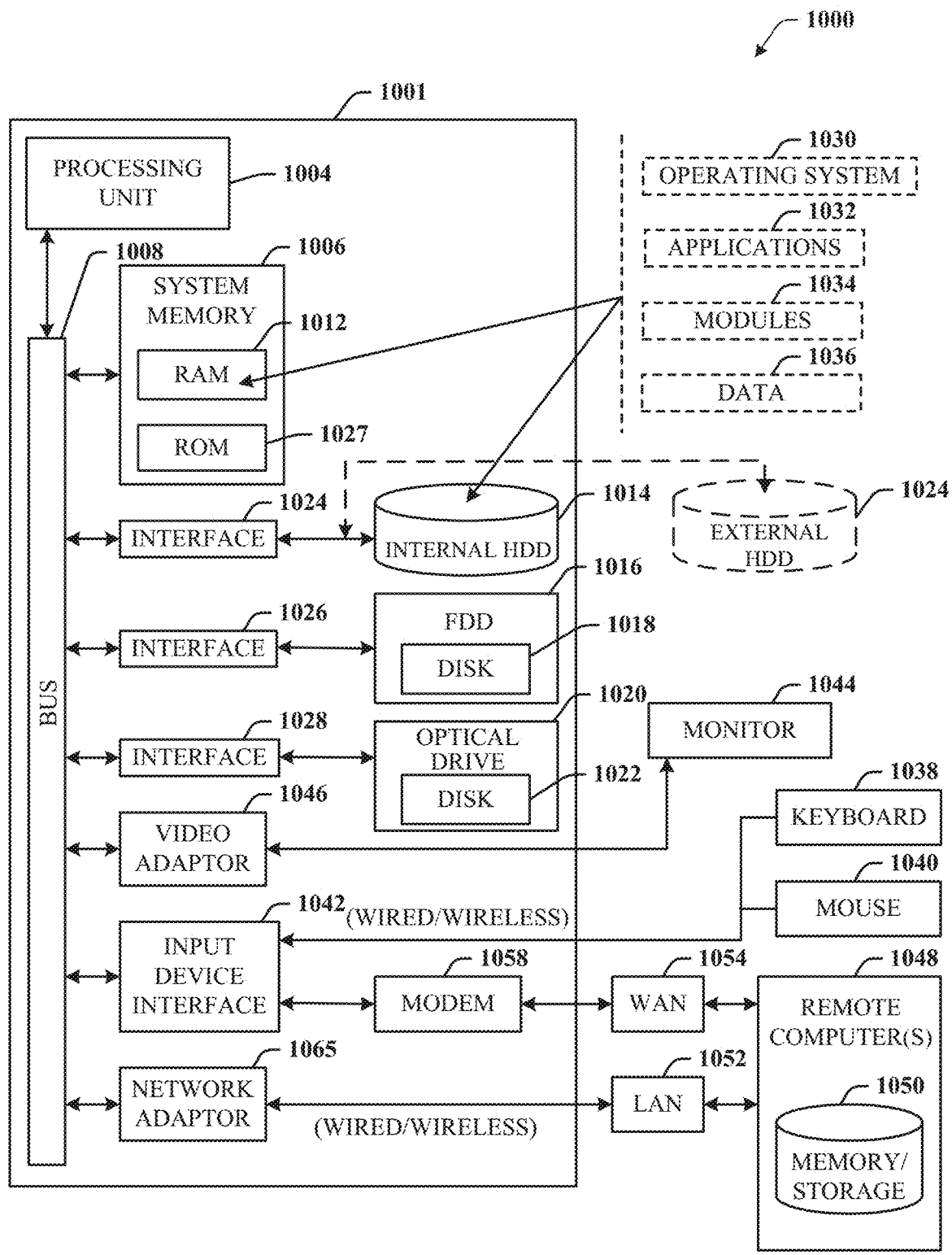
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 406) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054.

Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
   a processor; and
   a memory that stores executable instructions that, when executed by the processor, facilitate performance of operations, comprising:
   determining a cross-link interference of a first transmission received from a first transmitter device based on an angle of arrival of the first transmission; and
   determining a degradation level of a signal link associated with a second transmission received from a second transmitter device based on a signal strength of the second transmission and the cross-link interference associated with the angle of arrival of the first transmission.

2. The system of claim 1, wherein the operations further comprise:
   measuring the angle of arrival of the first transmission received during a period of time.

3. The system of claim 1, wherein the operations further comprise:
   receiving the first transmission during a measurement gap in a frame.

4. The system of claim 1, wherein the operations further comprise:
   receiving the first transmission from a mobile device.

5. The system of claim 1, wherein the operations further comprise:
   receiving the first transmission from a base station device.

6. The system of claim 1, wherein the determining of the cross-link interference of the first transmission comprises measuring the cross-link interference during a measurement gap among a base station device and a mobile device associated with the first transmission.

7. The system of claim 1, wherein the determining of the cross-link interference comprises determining the cross-link interference based on precoder data indicative of precoder information associated with the first transmission.

8. The system of claim 1, wherein the determining of the cross-link interference of the first transmission comprises:
   determining a load on the first transmitter device based on power of a reference signal received from the first transmitter device; and
   estimating the cross-link interference based on the load.

9. The system of claim 1, wherein the operations further comprise:
   measuring a differential angle of arrival of the first transmission.

10. The system of claim 9, wherein the determining of the cross-link interference comprises determining the cross-link interference based on the differential angle of arrival.

11. The system of claim 9, wherein the operations further comprise:
sending the differential angle of arrival associated with the first transmission to a base station device.

12. A method, comprising:
measuring, by a system comprising a processor, an angle of arrival of a first signal received from a first transmitter device;
estimating, by the system, a cross-link interference of the first signal based on the angle of arrival; and
estimating, by the system, degradation of a second signal received from a second transmitter device based on a signal strength of the second signal and the cross-link interference associated with the angle of arrival of the first signal.

13. The method of claim 12, further comprising:
receiving, by the system, the first signal during a measurement gap in a frame.

14. The method of claim 12, further comprising:
receiving, by the system, the first signal during a measurement gap between a base station device and a mobile device.

15. The method of claim 12, further comprising:
measuring, by the system, a differential angle of arrival of the first signal.

16. The method of claim 15, wherein the estimating of the cross-link interference comprises estimating the cross-link interference based on the differential angle of arrival.

17. A non-transitory machine-readable storage medium, comprising executable instructions that, when executed by a processor, facilitate performance of operations, comprising:
estimating a cross-link interference of a first transmission based on an angle of arrival data associated with the first transmission; and
determining a degree of degradation of a signal link associated with a second transmission based on a signal strength of the second transmission and the cross-link interference associated with the angle of arrival data.

18. The non-transitory machine-readable storage medium of claim 17, wherein the operations further comprise:
facilitating dynamic time division duplex operations based on the degree of degradation.

19. The non-transitory machine-readable storage medium of claim 17, wherein the operations further comprise:
aggregating the angle of arrival data over a period of time associated with the first transmission.

20. The non-transitory machine-readable storage medium of claim 17, wherein the operations further comprise:
measuring a differential angle of arrival data associated with the first transmission, wherein the estimating of the cross-link interference comprises estimating the cross-link interference based on the differential angle of arrival data.

* * * * *